No. 610,920. Patented Sept. 20, 1898.
F. RICHTER.
UNIVERSAL OR BALL JOINT.
(Application filed Jan. 20, 1898.)
(No Model.)
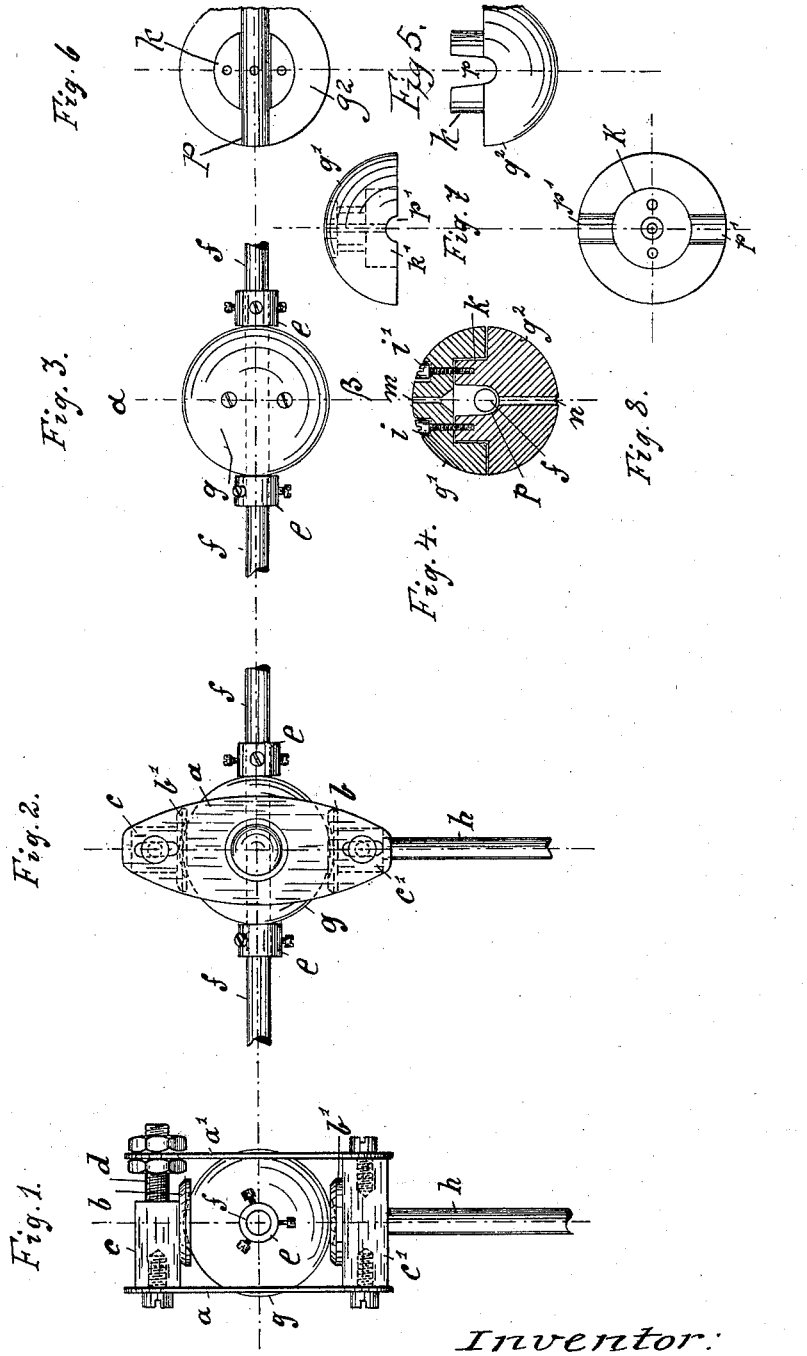
Witnesses:
E. B. Bolton
Otto Munk
Inventor:
Felix Richter
By Richards
his Attorneys.

UNITED STATES PATENT OFFICE.

FELIX RICHTER, OF TSCHOEPELN, GERMANY.

UNIVERSAL OR BALL JOINT.

SPECIFICATION forming part of Letters Patent No. 610,920, dated September 20, 1898.

Application filed January 20, 1898. Serial No. 667,288. (No model.)

*To all whom it may concern:*

Be it known that I, FELIX RICHTER, civil engineer, a citizen of Prussia, residing at Tschoepeln, near Muskau, in the Province of Brandenburg and Kingdom of Prussia, Germany, have invented certain new and useful Improvements in Universal or Ball Joints; and I do hereby declare the following to be a full, clear, and exact description of the invention, such as will enable others skilled in the art to which it appertains to make and use the same.

This invention relates to a universal ball or joint which admits of the transfer of the movements of one driving part to another being effected in all directions with the least possible friction on the moving parts and in such a way that both parts can execute a universal movement either simultaneously or each part separately. With this object the joint is formed of a ball and of a casing surrounding said ball on all sides. The ball is revolubly arranged on one of the parts—for instance, the driving part—in such a way that the axis of this part (shaft or axle) coincides with the diameter of the ball. The casing is mounted on the other part—for instance, the driven part—and incloses the ball in such a way that the latter finds at several points of a large sphere a bearing and support. Of course the ball may also be arranged on the driven and the casing on the driving part.

The invention is shown in the accompanying drawings as an example of construction which serves for conveying the reciprocating motion of an alternately pushing and pulling rod to a second rod or shaft, both rods being capable in case of need of executing a universal movement within certain limits.

Figure 1 is a front view of the joint; Fig. 2, a side view; Fig. 3, a view of the ball on its axis; Figs. 4 to 8, details of separate constructions of the ball.

Let it be assumed that a pushing and pulling force acts on the shaft $f$, Figs. 1 and 2, which is intended to move the shaft $h$ to and fro in such a way that the latter is enabled also to have a free mobility in all other directions. On the rod or shaft $f$ the ball $g$ is mounted, while the rod $h$ carries a casing surrounding the ball. The ball $g$ is perforated to correspond to the diameter of the shaft $f$ and is so mounted on the latter that the central line of the shaft $f$ and a diameter of the ball coincide and the ball $g$ may always freely rotate on the shaft $f$. This free-rotating mounting of the ball on the shaft $f$ has also for its object to enable any movement in a suitable direction to be imparted to the shaft $f$ by any outside power. If a lateral adjustment of the ball on the shaft $f$ be not desired, set-rings $e$, Figs. 1 and 2, may be arranged, or a keyway may be turned on the shaft $f$, the length of which corresponds to the diameter of the ball.

In the form of construction shown in Figs. 1 and 2 the casing consists of four parts, which inclose the ball like a frame, so that the latter is supported in this case at four points of a large sphere. Of course, according to the extent of the power employed and the kind of movement, the form of casing may be altered, and thereby the number of the points of support may be increased or diminished to a suitable degree.

The lower part $c'$ of the casing is mounted at the end of the rod $h$ and has two lateral bands $a\ a'$, which are connected at the other end to the part $c$. As in the present example the force is assumed to act in the direction of the rod $h$, the bearing-places $c\ c'$ of the ball are formed as thrust-cups $b\ b'$, while the adjacent parts $a\ a'$ of the casing are shown as bands, and the upper surface of the ball comes in contact or engages with their apertures or borings. Of course, vice versa, the cups $c\ c'$ may be formed into bands and the bands $a\ a'$ into cups, or, according to the extent and direction of the power, other parts may be formed as cups or apertured bands.

In order to fit the ball in the casing, the parts of the same are adjustably arranged by means of, for instance, the slots shown in dotted lines in Fig. 2 and screws $d$ shown in Fig. 1.

In order to allow of the ball being easily placed on the shaft $f$ or on its keyway or slot, it may be divided, as shown in Figs. 4 to 6. In order, however, that in spite of this division the equality and exactness of the running-surface of the ball may remain intact, one ball-half $g^2$, Figs. 5 and 6, is provided with a cylindrical pin $k$, which fits into a corresponding hole $k'$ in the other ball-half $g'$, Figs. 7 and 8. The bore-hole for the shaft $f$ is cut centrally through the separating-surfaces of the two halves of the ball, so that the ball-half $g'$ has a semicircular recess $p'$ and ball-half $g^2$ a semicircular recess $p$, with which recesses a recess in the pin $k$ is in alinement for the purpose of inserting the shaft, Fig. 5. Holes $m$ and $n$, Fig. 4, allow of the lubricating of the bearing of the axle being effected from both sides of the ball.

In order to hold the two halves of the ball together, screws $i\ i'$ are passed through one half $g'$ of the ball and engage in threaded recesses formed in the pin $k$. Instead of these screws other suitable means may be employed.

The advantages of the ball-joint or universal connection hereinbefore described are very evident. In consequence of the frame-like mounting of the ball in the casing a sure and firm mutual support of each part exists between the ball and its bands, allowing extensive mobility independent of one another and in all directions of the rods or shafts or the like connected with each of the two parts. As the ball can freely rotate on its shaft, it diminishes by its mutual or assisting movements the friction existing between the band or casing of the ball and the ball, which friction is of itself already extremely slight, so that wear of the separate parts is reduced to a minimum and an effective mobility is obtained. The division of the ball into two halves allows of the ball being mounted on any desired shaft or the like without dismounting the latter. The guide pin or key by its engagement in a suitable groove or bore of the other half of the ball prevents any lateral adjustment or displacement of the two halves of the ball and always insures an exact position of the parts of the ball. The peculiar composition of the joint imparts to both members a universal movement either simultaneously or each separately.

Having now particularly described and ascertained the nature of my said invention and in what manner the same is to be performed, I declare that what I claim is—

1. In combination, the shaft $f$, the ball loose thereon, the shaft $h$, the side plates, $a$, $a'$, having openings for receiving the ball, the block $c'$ connected with the shaft $h$ and having a seat for the ball, said sides $a$, $a'$, being connected with the block $c'$, the block $c$, connected with one of the sides and an adjusting-screw connecting said block with the other side, substantially as described.

2. In combination, the shaft $f$, the ball thereon, the shaft $h$, and the connection between the shaft $h$ and the ball comprising the plates $a\ a'$ adjustable toward each other and the blocks $c$, $c'$, between the plates and also adjustable toward each other, substantially as described.

3. In combination, the shaft $f$, the ball thereon, the shaft $h$ and the frame connecting the same with the ball, the said ball being made in two parts, one of which has a recess with a semicircular opening $p'$ and the other has a pair of projections $k$, $k$, with an opening $p$ between them, substantially as described.

In witness whereof I have hereunto set my hand in presence of two witnesses.

FELIX RICHTER.

Witnesses:
W. HAMBURGER,
CHAS. H. DAY.